US012278587B2

(12) United States Patent
Hinton et al.

(10) Patent No.: US 12,278,587 B2
(45) Date of Patent: Apr. 15, 2025

(54) COMPLEX BASEBAND ROTARY RESOLVER

(71) Applicant: L3Harris Technologies, Inc., Melbourne, FL (US)

(72) Inventors: Ryan W. Hinton, Erda, UT (US); Daniel G. Chilinski, Layton, UT (US); Kristian J. Harris, West Jordan, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 90 days.

(21) Appl. No.: 17/899,295

(22) Filed: Aug. 30, 2022

(65) Prior Publication Data

US 2024/0072694 A1 Feb. 29, 2024

(51) Int. Cl.
*G01D 3/02* (2006.01)
*H02P 6/18* (2016.01)

(52) U.S. Cl.
CPC .................................. *H02P 6/183* (2013.01)

(58) Field of Classification Search
CPC ....................................................... H02P 6/183
USPC ....................................................... 318/400.1
See application file for complete search history.

(56) References Cited

U.S. PATENT DOCUMENTS

| | | | |
|---|---|---|---|
| 2,995,302 A | 8/1961 | Ingwerson et al. | |
| 3,247,504 A | 4/1966 | Emmerich | |
| 3,262,109 A | 7/1966 | Swale et al. | |
| 3,849,774 A | 9/1974 | Barth | |
| 4,010,463 A | 3/1977 | Kay | |
| 4,134,106 A | 1/1979 | Hungerford | |
| 5,162,798 A * | 11/1992 | Yundt | G01P 3/44 341/115 |
| 5,912,638 A * | 6/1999 | Vlahu | H03M 1/645 341/115 |
| 5,949,359 A * | 9/1999 | Vlahu | G01P 3/488 341/116 |
| 6,665,308 B1 * | 12/2003 | Rakib | H04L 27/362 370/479 |
| 2009/0195197 A1 * | 8/2009 | Nishimura | B60L 50/16 324/207.25 |
| 2018/0197385 A1 * | 7/2018 | Jayaraman | H02P 23/0004 |
| 2019/0025052 A1 | 1/2019 | Nee et al. | |
| 2019/0293429 A1 | 9/2019 | Cameron et al. | |

FOREIGN PATENT DOCUMENTS

| | | |
|---|---|---|
| DE | 102018213402 A1 | 2/2020 |
| EP | 0877464 | 11/1998 |
| EP | 0877489 | 11/1998 |

OTHER PUBLICATIONS

European Search Report received for EP Patent Application No. 23189014.6, mailed on Jan. 22, 2024, 7 pages.

* cited by examiner

*Primary Examiner* — Gabriel Agared
(74) *Attorney, Agent, or Firm* — Fox Rothschild LLP; Carol E. Thorstad-Forsyth

(57) ABSTRACT

Monitoring rotating machine position using a resolver having an input primary and one or more output secondaries magnetically coupled to the input primary. The method includes exciting the input primary with an exciter input signal, causing a first scaled version of the exciter input signal to appear in a first output secondary. Output from the first output secondary is collected. The collected output from the first output secondary is demodulated to recover gain from the input primary.

23 Claims, 5 Drawing Sheets

COMPLEX BASEBAND ROTARY RESOLVER

BACKGROUND

Background and Relevant Art

A resolver is used to measure rotation, for example, of a motor shaft. Typically, a resolver includes three major components, including a primary winding coupled to a rotor of a motor and two secondary windings coupled to the stator of the motor. The secondary windings are spaced approximately 900 apart from each other. An AC exciter input signal is sent through the resolver primary coupled the rotor to "excite" the secondary windings. As the rotor rotates, the primary winding will excite the secondaries such that Amplitude modulation of the AC exciter input signal is produced at each secondary, where the modulation is shifted by 900. Assuming a constant rate of rotation of the rotor, the first secondary will produce a sine modulation of the exciter input signal, while the second secondary will produce a cosine modulation of the exciter input signal, based on the rotor position.

By exciting the primary winding with a voltage $e_p = E_m \sin(\omega_c t)$, then the voltages induced in the secondary windings (sine and cosine) are given by: $e_{sine} = k_s E_m \sin(\omega ct) \sin(\theta)$ and $e_{cosine} = k_c E_m \sin(\omega ct) \cos(\theta)$ where, $\omega_c$ is the excitation frequency, $\theta$ is the rotor position, and $k_s$ and $k_c$ are the transformation ratios between primary to secondary.

The magnitudes of the AC signals on the output of the two secondaries can be used to compute the angle of the rotor (and hence, the shaft) by computing an arc-tangent.

Currently, systems attempt to sample the output from the secondaries exactly at the AC peaks. This solution provides simple processing but gives poor results for a number of different reasons. For example, noise on the signals can reduce the accuracy of estimates for angular position of the rotor. Alternatively, or additionally, sampling electronics can have slightly different delays and/or gains for the different secondaries. Alternatively, or additionally, the two different secondaries can be mounted slightly greater than, or slightly less than 90° apart from each other. Each of these issues can cause imprecision and/or errors when attempting to compute rotor position.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment illustrated herein includes a method that may be practiced in a rotating machine environment. The method includes acts for monitoring shaft position using a resolver having an input primary and one or more output secondaries magnetically coupled to the input primary. The method includes exciting the input primary with an exciter input signal, causing a first scaled version of the exciter input signal to appear in a first output secondary. The output from the first output secondary is demodulated to recover gain from the input primary.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein perform high-speed sampling of output from secondaries of a resolver to obtain high-resolution representations of the signals output from the secondaries of the resolver. In particular, the primary winding (sometimes referred to herein as 'primary') of the resolver, typically mechanically coupled to a rotor of a motor, or other rotating shaft of a rotating machine, is excited using an exciter input signal, which is ordinarily (but not necessarily) a sine wave of having a frequency of $\omega_c$. This exciter input signal is electromagnetically coupled into secondary windings (each of which is sometimes referred to herein as 'secondary') typically mechanically coupled to a stator of the motor (or some other stationary member of a rotating machine) causing those secondary windings to be excited such that they output signals dependent on the angular position of the rotor with respect to the stator. That is, a first secondary will output a signal $k_s E_m \sin(\omega ct) \sin(\theta)$, where $\theta$ is the angular rotor position. The second secondary will output a signal $k_c E_m \sin(\omega ct) \cos(\theta)$. Note that while this illustrates a typical embodiment, other embodiments may be implemented where the secondaries are located at other angles from each other. Indeed, nearly any angle can be implemented so long as the angle is not an integer multiple of 180°. Additionally, or alternatively, the location of the primaries and secondaries can be reversed. That is, the primaries can be coupled to the stator, while the secondaries are coupled to the rotor. However, the examples illustrated herein will be illustrated in the context of primaries coupled to the rotor and secondaries coupled to the stator.

These output signals are collected. In some embodiments, the output signals are collected by sampling and are sampled at a different rate than the exciter input signal frequency. In particular, sampling can occur at various different rates, so long as the exciter frequency is not near an integer multiple of half the sample rate so as to minimize aliasing. For example, some embodiments may be designed to sample in a fashion that is compliant with the Nyquist Sampling Theorem which indicates that sampling is performed at least twice the highest frequency present in the signal. Typically, such embodiments may be implemented to sample at least 25% faster than this to allow for implementation limitations (e.g., anti-aliasing filter).

Alternatively, embodiments may sub-sample. A demodulator, as illustrated herein, can use a sample rate lower than the exciter frequency. For example, assuming sampling at 60% of the exciter frequency yields 0.6 samples per cycle of the exciter input signal. This would yield nearly identical functionality to a system that implements 3 samples per cycle of the exciter input signal. Other sampling can be used as appropriate.

As long as noise in the system is "white" (substantially equal energy at all frequencies) and the noise energy per sample stays the same, a higher sample rate means more averaging and less noise at the resolver output. Usually a higher sample rate (wider bandwidth) means a higher noise variance per sample, so the demodulated output described below typically is not significantly improved with a higher sample rate. However, a higher sample rate always means a finer time resolution on angle estimate can be achieved. Note that typical exciter frequencies (2 kHz-10 kHz) are usually much faster than mechanical motion.

Outputs collected from the secondaries are then "demodulated" to create a complex baseband representation of the output signals by removing the excitation exciter input signal. Various operations can be performed on this complex representation. For example, noise can be filtered, delay differences between electronics for the two secondaries can be corrected, gain imbalances between electronics for the two secondaries can be corrected, phase errors (for example errors caused by the secondaries not being exactly 90° apart) can be corrected, etc.

Figure 1:
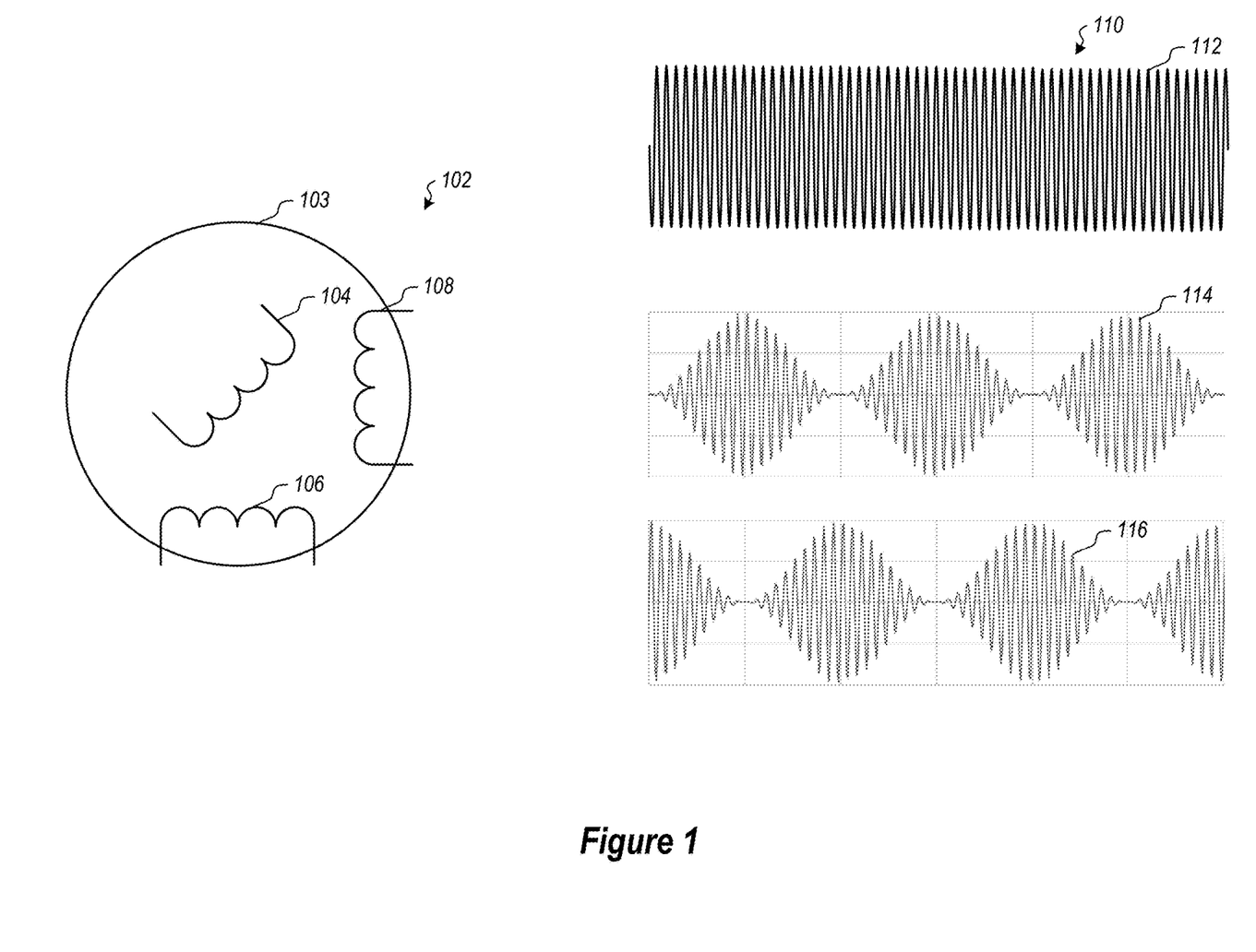
FIG. 1 illustrates an example of a resolver mounted to a motor; an exciter input signal and output signals.

Examples are now illustrated with reference to the Figures. FIG. 1 illustrates resolver 102 coupled to a motor 103. Note that while a motor is shown, it should be appreciated that embodiments can be implemented in other rotating machines. The resolver 102 comprises a primary 104 coupled to a rotor of the motor 103. The resolver 102 further includes two secondaries 106 and 108. The secondaries are coupled to a stator of the motor 103. In this example, the secondaries 106 and 108 are arranged at approximately 90° from each other on the stator. The exciter input signal appears in the first secondary with a gain proportional to the sine of the instantaneous angle of the rotor, and the exciter input signal appears in the second secondary with a gain proportional to the cosine of the instantaneous angle of the rotor. This, of course assumes a 900 angular separation of the secondaries, and other angles can be used described with slightly more complex mathematical relationships. Note that other alternative arrangement can be implemented. For example, generally the invention relates to a rotating machine. The rotating machine will have a first portion and a second portion. Embodiments monitor the position of the first portion with respect to the second portion of the rotating machine. A primary is coupled to the first portion and one or more secondaries are coupled to the second portion of the rotating machine. In the examples illustrated here, the first portion is a rotor, which is typically a shaft and the second portion is a stator, which is typically connected to, or part of a housing. It should be noted however, that in other embodiments, the shaft may be the stator and the housing may be part of the rotor. Thus, the first and second portions have different movement characteristics with respect to each other and are not necessarily specific to stators, rotors, shafts, or housings in general, but can be specific in certain embodiments.

In the particular example illustrated, assuming that the motor is running at a constant speed, this will result in the modulation similar to that shown in the diagram 110 of FIG. 1. The diagram 110 illustrates an exciter input signal 112 that is input into the primary 104. Due to the changing amplitude of the exciter input signal 112 over time, this causes currents to be excited in the secondaries 106 and 108. If the rotor is rotating at a constant speed, the first secondary output 114 will be excited in the first secondary 106 and the second secondary output 116 will be excited in the second secondary 108 as shown by the amplitude modulated signals as shown in the diagram 110.

Note that the representation shown in the diagram 110 of FIG. 1 show an idealized output for the secondaries 106 and 108, whereas the actual output from the secondaries 106 and 108 will have various defects and artifacts, such as noise, phase mismatches, signal delays, etc., as described previously. Further, components used for sampling the outputs 114 and 116 may introduce errors as discussed previously. In particular, previously systems would attempt to sample the outputs 114 and 116 at the peaks of the outputs. However, noise on the outputs (as will be illustrated in more detail in FIG. 2), differing delays for circuitry used for sampling the outputs, gain imbalances for circuitry measuring the outputs, phase errors resulting from the secondaries 106 and 108 not being spaced exactly 90° apart on the stator, etc. results in errors and lack of precision in computing rotor position.

Figure 2:
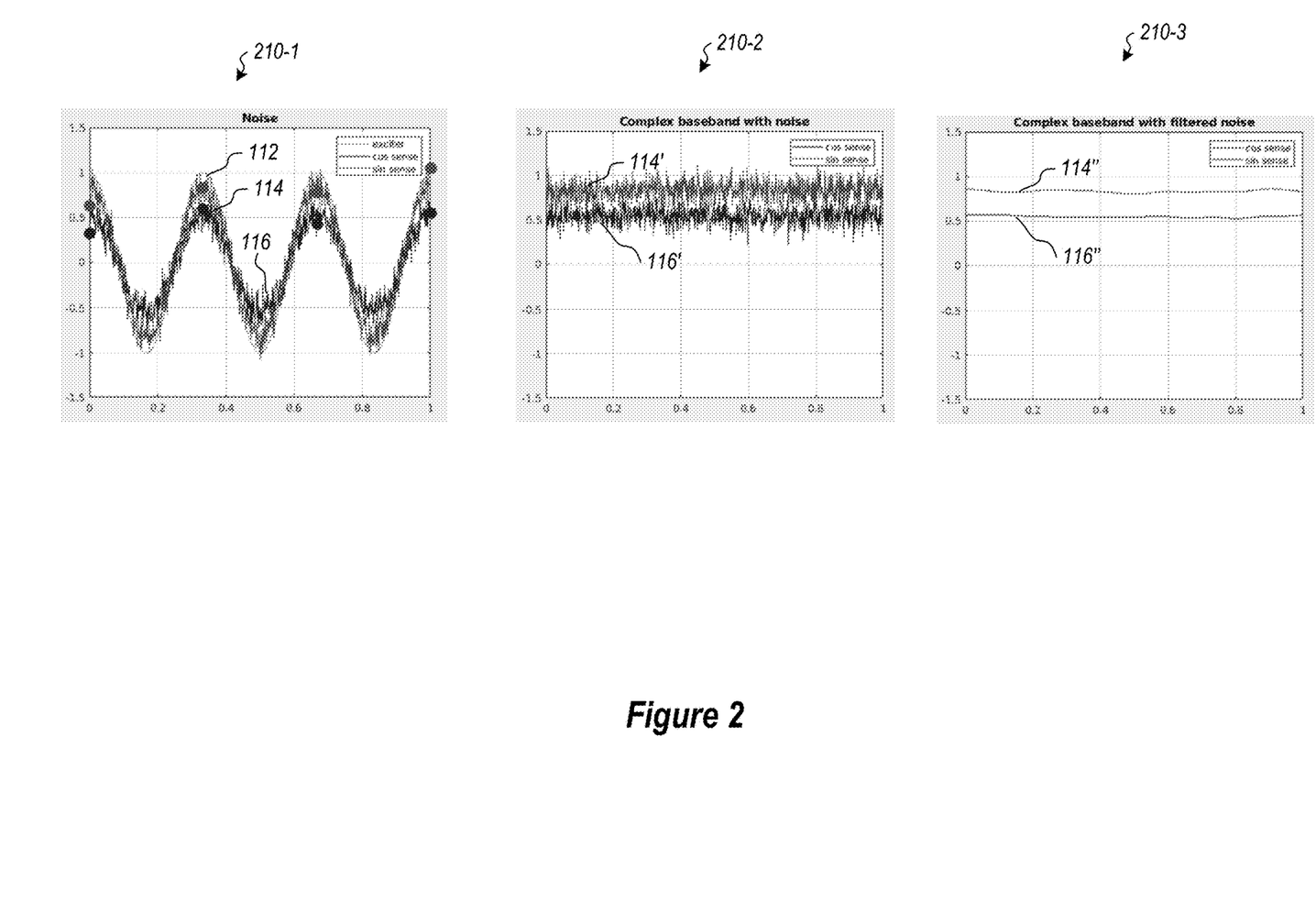
FIG. 2 illustrates various diagrams of sampled signals, 'demodulated signals' and filtered signals.

For example, FIG. 2 illustrates a diagram 210-1 which plots a few cycles of the exciter input signal 112 along with a few cycles of the first secondary output 114 and the second secondary output 116. Note that the distinct amplitude modulation illustrated in FIG. 1 is more subtle in FIG. 2, as FIG. 1 illustrates multiple cycles of the exciter input signal 112 and corresponding modulation of the first secondary output 114 and the second secondary output 116, whereas FIG. 2 shows only a few cycles of the exciter input signal 112 and a few corresponding cycles of the first secondary output 114 and the second secondary output 116. Thus, the first secondary output 114 and the second secondary output 116 shown in FIG. 2 do not have a sufficient number of cycles of the exciter input signal to fully illustrated amplitude modulation as might be seen by showing full or half cycles of the amplitude modulation. Thus, while FIG. 1 illustrates what might be observed during three full rotations of the motor 103, FIG. 2 illustrates what might be observed by one or two degrees of rotation of the motor 103.

FIG. 2 illustrates in the diagram 210-1 the output of high-speed sampling of the secondaries 106 and 108. Thus, the first secondary output 114 and second secondary output 116 are shown with significant noise as compared to the exciter input signal 112. Embodiments illustrated herein are able to correct for that noise by various digital signal processing techniques.

Figure 3:
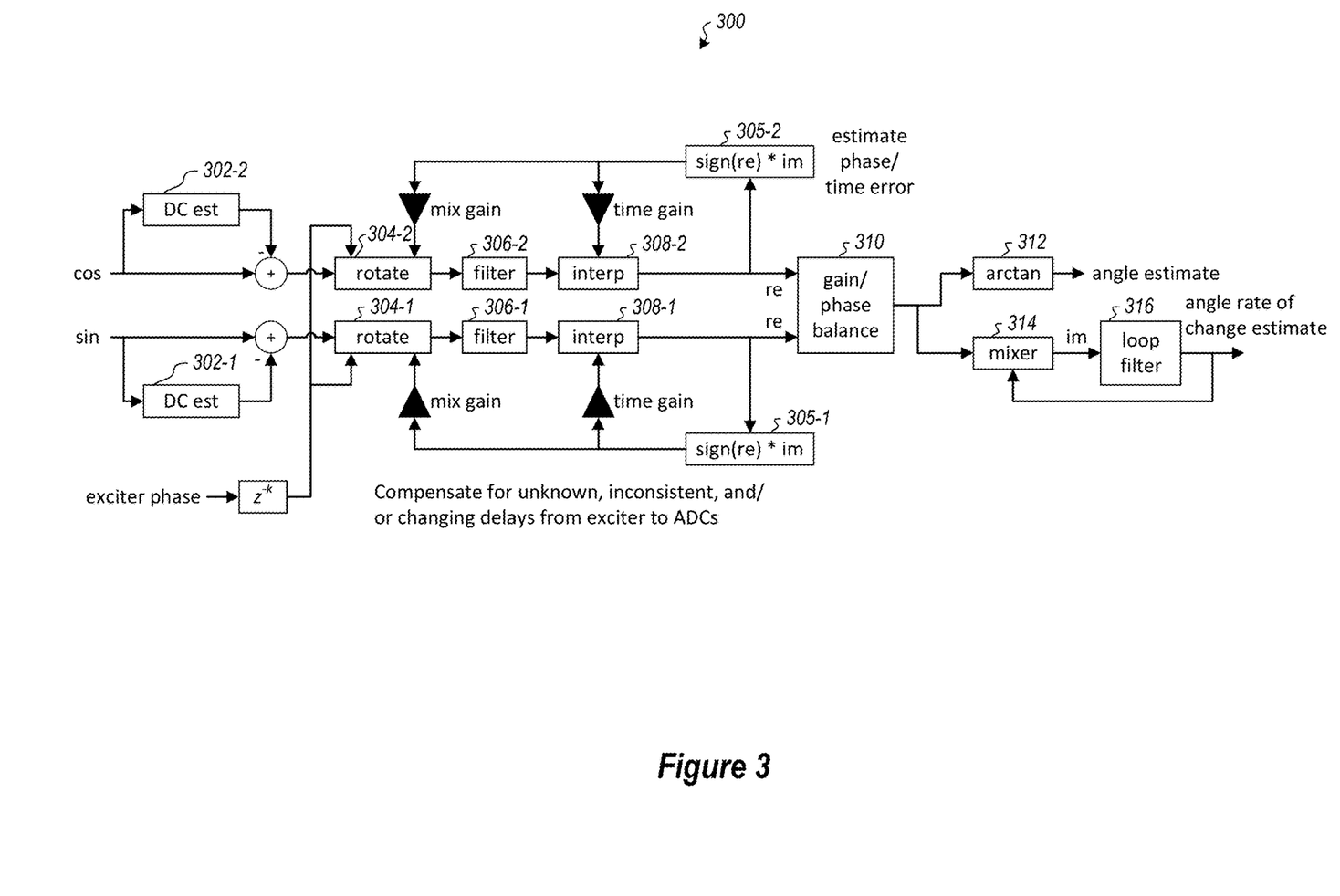
FIG. 3 illustrates a block diagram of a system for processing output signals from a resolver.

FIG. 2 includes a diagram 210-2. In this diagram, the first secondary output 114 and second secondary output 116 are demodulated to form the first demodulated output 114' and the second demodulated output 116' respectively. This serves to remove the exciter input signal 112 modulation from the outputs 114 and 116 to create baseband signals. FIG. 3 illustrates that this demodulation can be performed in a signal processor 300 by various components. For example, FIG. 3 illustrates DC estimators 302-1 and 302-2 configured to estimate DC bias on the outputs 114 and 116 respectively. These DC estimates are subtracted from the signals to remove the DC bias. Demodulators 304-1 and 304-2, using the outputs 114 and 116 with bias removed, and phase information about the exciter input signal 112 demodulate the outputs 114 and 116 to produce demodulated outputs 114' and 116' respectively. Note that the demodulators 304-1 and 304-2 receive attenuated (as illustrated by the mix gain elements shown in FIG. 3) feedback signals from estimators 305-1 and 305-2 respectively that estimate phase errors on processed signals as illustrated in FIG. 3. These phase errors are due to differing delays in analog receiver chains. These phase errors are detected by operations performed by the estimators 305-1 and 305-2 on the real and imaginary parts of signals processed by the signal processor 300.

As illustrated in the diagram 210-2, the demodulated outputs 114' and 116' nonetheless have noise. This noise is at least partially removed by filters 306-1 and 306-2 respectively to produce the first and second demodulated, filtered outputs 114" and 116" shown in diagram 210-3 respectively.

FIG. 3 further illustrates interpolators 308-1 and 308-2. These components are directed to correcting differences in the delay from the exciter input signals back to the primary and secondary analog to digital converters (ADCs). If only the phase is corrected, the desired baseband signals 114' and 116' can be obtained. However, they will not be aligned in time. For example, when rotating, when 114 is at its maximum, it may take some time before 116 goes through zero as expected. The interpolators 308-1 and 308-2 even out this delay so the signals 114" and 116" appear "simultaneous".

FIG. 3 further illustrates a gain/phase balancer 310. The gain/phase balancer 310 can correct several different issues. For example, the gain/phase balancer 310 can correct gain differences between sampling on the first output secondary and second output secondary. That is, different circuit components will be used to collect signals on the first output secondary and second output secondary. The fact that different discrete components are used, with slightly different characteristics, results in gain differences caused by the sampling circuitry. This can be corrected in the gain/phase balancer by adjusting gain using various adjustable amplifiers and/or other circuitry.

Alternatively, or additionally, the gain/phase balancer 310 can correct a phase difference between the first output secondary and second output secondary. These phase differences, as discussed above, may be caused by the output secondaries not being at exactly 90° from each other. The gain/phase balancer may include signal processing components to compensate for these phase differences.

FIG. 3 illustrates computation resources 312 that is able to compute an arctan of the processed outputs from the first output secondary and second output secondary. This computation is the angle estimate of the rotor of the motor 103.

Note that FIG. 3 further illustrates that some embodiments may include a mixer 314 and loop filter 316. The mixer and loop filter are configured in a such a way so as to accumulate angle estimates over time so as to be able to compute and output angle rate of change estimates. The angle position estimate computed from the arctan can be processed to estimate the velocity and acceleration and higher-order derivatives of the motion. For example, this may be accomplished using finite difference equations or other modalities. Additionally, the mixer and loop filter (implementing a phase-locked loop (PLL)) produces an angle position estimate as well as an angle velocity estimate. Thus, embodiments can provide an indication of acceleration of a motor rotor.

Note that embodiments may use FPGAs to implement the various components illustrated in the signal processor.

Figure 4:
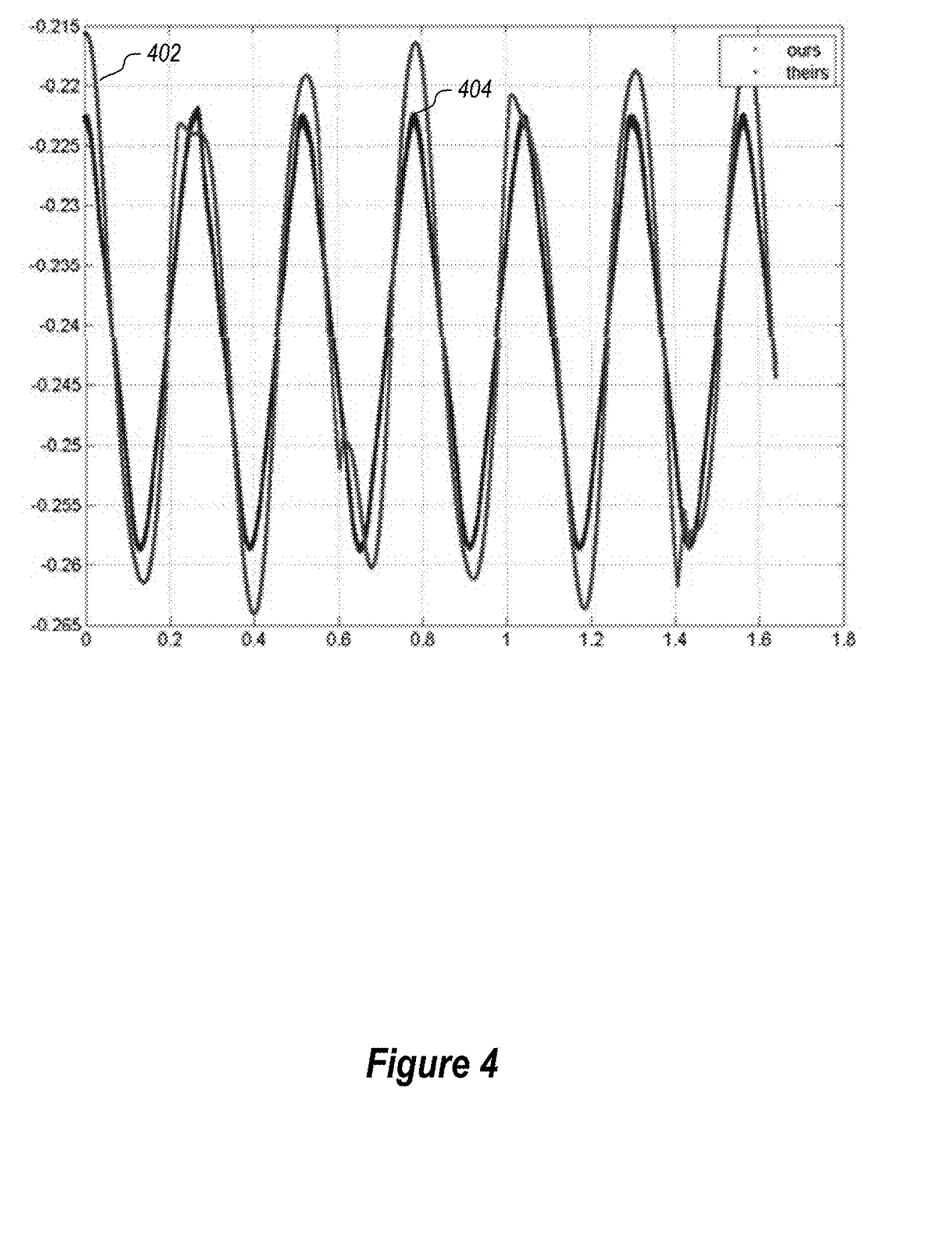
FIG. 4 illustrates a diagram comparing previous resolver outputs with outputs from an embodiment implementing high speed sampling and processing.

Referring now to FIG. 4, an example of signals 402 collected using previous resolver technologies is compared to signals 404 collected using embodiments as illustrated herein. As illustrated in FIG. 4, cleaner, more consistent signals can be achieved using the embodiments illustrated herein, as compared to previous technology.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
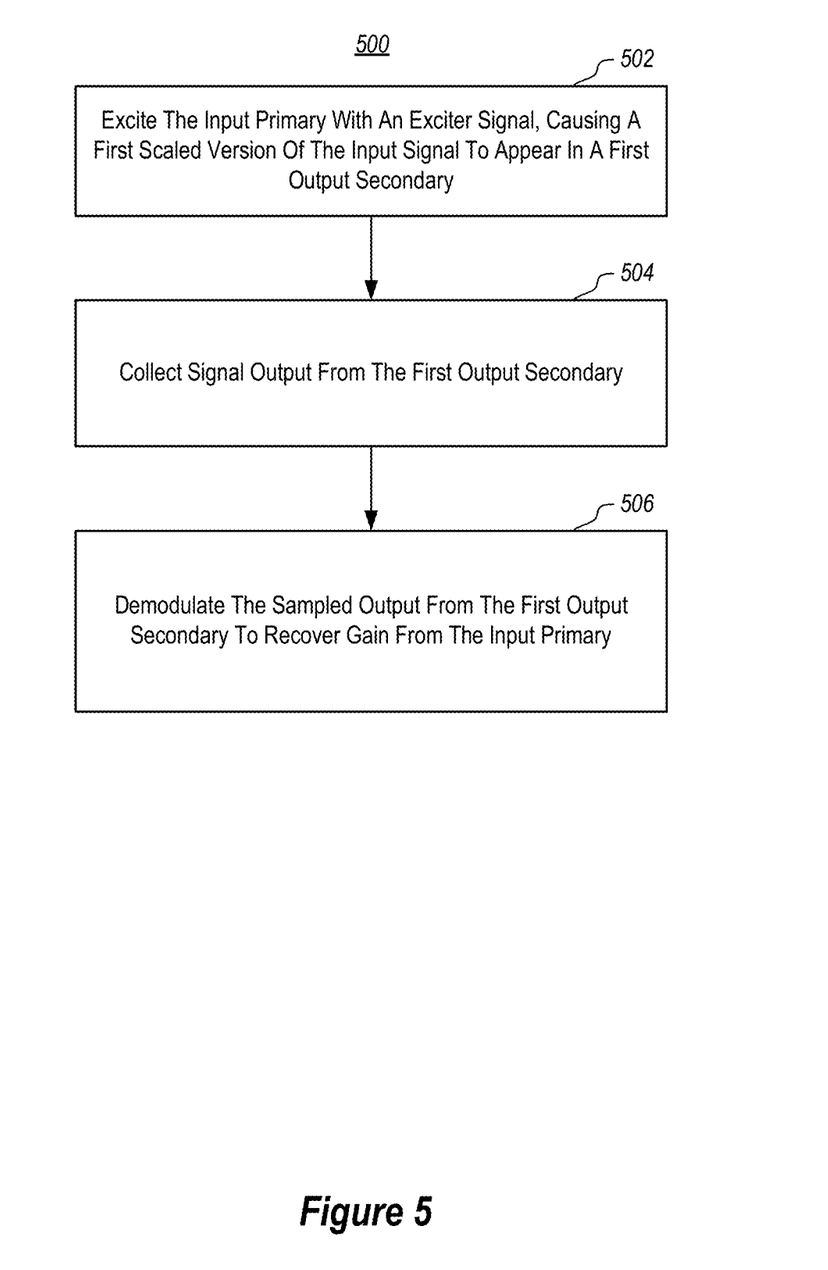
FIG. 5 illustrates a method of monitoring rotating shaft position.

Referring now to FIG. 5, a method 500 is illustrated. The method 500 may be practiced in a rotating machine monitoring environment. The method includes acts for monitoring rotor position with respect to a stator using a resolver having an input primary and one or more output secondaries magnetically coupled to the input primary. The method 500 includes exciting the input primary with an exciter input signal, causing a first scaled version of the exciter input signal to appear in a first output secondary (act 502).

The method 500 further includes collecting signal output from the first output secondary (act 504). This is done at an appropriate rate to capture the sampled signal bandwidth The method 500 further includes demodulating the collected output from the first output secondary to recover gain from the input primary (act 506).

The method 500 may further be performed where exciting the input primary causes a second scaled version of the exciter input signal to appear in a second output secondary. The method 500 may further include collecting output from the second output secondary. The method 500 may further include demodulating the collected output from the second output secondary to recover gain from the input primary.

In some embodiments, the method 500 may further include filtering the demodulated output from the first output secondary to create a first demodulated, filtered output and filtering the demodulated output from the second output secondary to create a second demodulated, filtered output. Example of the results of this are illustrated in FIG. 2 by the filtered outputs 114" and 116".

The method 500 may further include using the demodulated output from the first output secondary and the demodulated output from the second output secondary, determining angular positions of the shaft. FIG. 3 illustrates an example where this can be accomplished using the computation resources 312, which may be for example, computation hardware and/or software running on appropriate hardware.

The method 500 may further include using the demodulated output from the first output secondary and the demodulated output from the second output secondary, determining angular velocity of the shaft. FIG. 3 illustrates where the mixer 314 and loop filter 316 can be used to achieve this functionality.

Note that in some applications, the increased precision and accuracy of the demodulator approach allows simpler designs as extra encoders and related circuits are unnecessary. Indeed, precise velocity control that previously required encoder hardware and circuits can be accomplished using just the demodulated outputs.

Some embodiments of the method 500 may further include, using the demodulated output from the first output secondary and the demodulated output from the second output secondary, correcting delay differences between the first output secondary and second output secondary.

Some embodiments of the method 500 may further include, using the demodulated output from the first output secondary and the demodulated output from the second output secondary, correcting gain differences between sampling on the first output secondary and second output secondary.

Some embodiments of the method 500 may further include, using the demodulated output from the first output secondary and the demodulated output from the second output secondary, changing a phase difference between the first output secondary and second output secondary.

The functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), analog devices, etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a rotating machine environment, a method of monitoring rotor position with respect to a stator using a resolver having an input primary and one or more output secondaries magnetically coupled to the input primary, the method comprising:
    exciting the input primary with an exciter input signal, causing a first scaled version of the exciter input signal to appear in a first output secondary;
    collecting a first signal output from the first output secondary; and
    demodulating the first signal output collected from the first output secondary to create a first complex baseband signal based on phase information about the exciter input signal and phase errors estimated based on the first complex baseband signal.

2. The method of claim 1, further comprising:
    wherein exciting the input primary causes a second scaled version of the exciter input signal to appear in a second output secondary magnetically coupled to the input primary;
    collecting a second signal output from the second output secondary; and
    demodulating the signal output collected from the second output secondary, to a second complex baseband signal based on the phase information about the exciter input signal and phase errors estimated based on the second complex baseband signal.

3. The method of claim 2, further comprising:
    filtering the demodulated output from the first output secondary to create a first demodulated, filtered output; and
    filtering the demodulated output from the second output secondary to create a second demodulated, filtered output.

4. The method of claim 2, further comprising using the demodulated output from the first output secondary and the demodulated output from the second output secondary, performing at least one of the following by operating on real and imaginary parts of the first and second complex baseband signals:
    determining angular position of the rotor;
    determining angular velocity of the rotor;
    correcting delay differences between the first output secondary and second output secondary;
    correcting gain differences between signal output on the first output secondary and second output secondary; or
    changing a phase difference between the first output secondary and second output secondary.

5. The method according to claim 1, wherein said first complex baseband signal is created further based on the first signal output with DC bias removed.

6. The method according to claim 1, wherein the resolver is coupled to a rotating machine comprising a rotor and the stator, and each of the input primary and the first output secondary being mechanically coupled to a respective one of the rotor and the stator.

7. The method according to claim 1, further comprising compensating for other phase errors due to the first output secondary being arranged greater or less than 90° apart from a second output secondary of the resolver.

8. In a rotating machine environment, a system for monitoring position of a first portion of a rotating machine with respect to a second portion of the rotating machine using a resolver having an input primary and one or more output secondaries magnetically coupled to the input primary, the system comprising:
    a first demodulator coupled to a first output secondary of the resolver that is coupled to the first portion of the rotating machine;
    wherein the first output secondary produces a first scaled version of an exciter input signal into the input primary of the resolver that is coupled to the second portion of the rotating machine based on a rotational position of the second portion of the rotating machine with respect to the first portion of the rotating machine;
    wherein the first demodulator is configured to collect a first signal output from the first output secondary and to demodulate the first signal output collected from the first output secondary to create a first complex baseband signal based on phase information about the exciter input signal and phase errors estimated based on the first complex baseband signal.

9. The system of claim 8, wherein the first portion of the rotating machine comprises a rotating portion of the rotating machine and the second portion of the rotating machine comprises a static portion of the rotating machine.

10. The system of claim 8, wherein the first portion of the rotating machine comprises a static portion of the rotating machine and the second portion of the rotating machine comprises a rotating portion of the rotating machine.

11. The system of claim 8, further comprising a second demodulator coupled to a second output secondary of the resolver that is coupled to the first portion of the rotating machine;
    wherein the second output secondary produces a second scaled version of the exciter input signal into the input primary of the resolver that is coupled to the second portion of the rotating machine based on position of the second portion of the rotating machine with respect to the first portion of the rotating machine;

wherein the second demodulator is configured to collect a second signal output from the second output secondary and to demodulate the second signal output collected from the second output secondary to create a second complex baseband signal based on the phase information about the exciter input signal and phase errors estimated based on the second complex baseband signal.

12. The system of claim 11, further comprising:
a first filter coupled to the first demodulator and configured to filter the demodulated output from the first output secondary to create a first demodulated, filtered output; and
a second filter coupled to the second demodulator configured to filter the demodulated output from the second output secondary to create a second demodulated, filtered output.

13. The system of claim 11, further comprising computation resources coupled to the first and second demodulators, and configured to use the demodulated output from the first output secondary and the demodulated output from the second output secondary to determine angular positions of the first and second portions of the rotating machine with respect to each other.

14. The system of claim 11, further comprising hardware coupled to the first and second demodulators, and configured to use the demodulated output from the first output secondary and the demodulated output from the second output secondary to determine angular velocity of the first and second portions of the rotating machine with respect to each other.

15. The system of claim 11, further comprising an interpolator coupled to the first and second demodulators, and configured to use the demodulated output from the first output secondary and the demodulated output from the second output secondary to correct delay differences between the first output secondary and second output secondary.

16. The system of claim 11, further comprising a gain/phase balancer coupled to the first and second demodulators, and configured to use real and imaginary portions of the demodulated output from the first output secondary and the demodulated output from the second output secondary to correct gain differences between the first output secondary and second output secondary.

17. The system of claim 11, further comprising a gain/phase balancer coupled to the first and second demodulators, and configured to use real and imaginary portions of the demodulated output from the first output secondary and the demodulated output from the second output secondary to change a phase difference between the first output secondary and second output secondary.

18. In a rotating machine environment, a method of manufacturing a system for monitoring position of a first portion of a rotating machine with respect to a second portion of the rotating machine using a resolver having an input primary and one or more output secondaries magnetically coupled to the input primary, the system comprising:
coupling a first demodulator to a first output secondary of the rotating machine that is coupled to the first portion of the rotating machine, wherein the first output secondary produces a first scaled version of an exciter input signal input into the input primary that is coupled to the second portion of the rotating machine based on a rotation position of the second portion of the rotating machine with respect to the first portion of the rotating machine, wherein the first demodulator is configured to collect a signal output from the first output secondary and to demodulate the signal output collected from the first output secondary to create a first complex baseband signal based on phase information about the exciter input signal and phase errors estimated based on the first complex baseband signal; and
coupling a second demodulator coupled to a second output secondary of the rotating machine that is coupled to the first portion of the rotating machine, wherein the second output secondary produces a second scaled version of the exciter input signal input into the input primary based on position of the first portion of the rotating machine, wherein the second demodulator is configured to collect a second signal output from the second output secondary and to demodulate the second signal output collected from the second output secondary to create a second complex baseband signal.

19. The method of claim 18, further comprising:
coupling a first filter to the first demodulator and configuring the first filter to filter the demodulated output from the first output secondary to create a first demodulated, filtered output; and
coupling a second filter coupled to the second demodulator configuring the second filter to filter the demodulated output from the second output secondary to create a second demodulated, filtered output.

20. The method of claim 18, further comprising coupling computation resources to the first and second demodulators, and configuring the computation resources to use the demodulated output from the first output secondary and the demodulated output from the second output secondary to determine angular positions of the first and second portions of the rotating machine with respect to each other.

21. The method of claim 18, further comprising coupling a gain/phase balancer to the first and second demodulators, and configuring the gain/phase balancer to perform at least one of the following:
using real and imaginary portions of the demodulated output from the first output secondary and the demodulated output from the second output secondary to correct gain differences between the first output secondary and second output secondary; or
using the real and imaginary portions of the demodulated output from the first output secondary and the demodulated output from the second output secondary to change a phase difference between the first output secondary and second output secondary.

22. The method of claim 18, wherein the first portion of the rotating machine comprises a rotor and the second portion of the rotating machine comprises a stator.

23. The method of claim 18, wherein the first portion of the rotating machine comprises a stator and the second portion of the rotating machine comprises a rotor.

* * * * *